(12) United States Patent  (10) Patent No.: US 7,213,152 B1
Gafken et al.  (45) Date of Patent: May 1, 2007

(54) MODULAR BIOS UPDATE MECHANISM

(75) Inventors: Andrew H. Gafken, Folsom, CA (US); Todd D. Wilson, Granite Bay, CA (US); Thomas Dodson, El Dorado Hills, CA (US); John V. Lovelace, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/503,939

(22) Filed: Feb. 14, 2000

(51) Int. Cl. *H04L 9/32* (2006.01)

(52) U.S. Cl. .................. 713/187; 713/191; 726/26; 726/30

(58) Field of Classification Search ............ 713/187, 713/1–2, 191, 168, 189–193, 200, 22–23, 713/27, 34; 711/100–104, 163–164; 726/22–23, 726/26–27, 34, 30
See application file for complete search history.

(56) References Cited

U.S. PATENT DOCUMENTS

| | | | |
|---|---|---|---|
| 5,369,707 A * | 11/1994 | Follendore, III ............ 713/155 |
| 5,564,020 A * | 10/1996 | Rossi ........................ 398/115 |
| 5,579,522 A * | 11/1996 | Christeson et al. ............ 713/2 |
| 5,671,413 A * | 9/1997 | Shipman et al. ................ 713/2 |
| 5,794,054 A * | 8/1998 | Le et al. ..................... 710/240 |
| 5,805,882 A * | 9/1998 | Cooper et al. ................. 713/2 |
| 5,835,761 A | 11/1998 | Ishii et al. ................... 395/653 |
| 5,844,986 A * | 12/1998 | Davis ......................... 713/187 |
| 5,918,047 A * | 6/1999 | Leavitt et al. ................. 713/2 |
| 5,930,830 A | 7/1999 | Mendelson et al. ......... 711/171 |
| 5,978,912 A * | 11/1999 | Rakavy et al. ................. 713/2 |
| 6,031,305 A * | 2/2000 | Satoh et al. .............. 310/49 R |
| 6,091,430 A * | 7/2000 | Bodin et al. ................ 345/536 |
| 6,185,696 B1 * | 2/2001 | Noll ............................... 714/6 |
| 6,823,435 B1 * | 11/2004 | Wisor ......................... 711/170 |

FOREIGN PATENT DOCUMENTS

| | | |
|---|---|---|
| EP | 0 328 232 A2 | 1/1989 |
| WO | WO 9427219 | 11/1994 |
| WO | WO 98/15082 | 4/1998 |
| WO | WO 98/45768 | 10/1998 |
| WO | WO 99/30227 | 6/1999 |

OTHER PUBLICATIONS

Abstract of Hei 10-083309 published Mar. 31, 1998 obtained from IPDL (International Patent Digital Library) database of JPO.

* cited by examiner

*Primary Examiner*—Hosuk Song
(74) *Attorney, Agent, or Firm*—Kenyon & Kenyon LLP

(57) ABSTRACT

A modular BIOS update mechanism provides a standardized method to update options ROMs and to provide video and processor microcode upgrades in a computer system without requiring a complete replacement of the system BIOS. The MBU mechanism provides several advantages. First, new features and BIOS bugs from earlier release may be delivered to an installed base of end-user systems even if direct OEM support cannot be identified. Also, BIOS components may be provided as a validated set of revisions. With resort to a validation matrix, BIOS updates may be managed easily. The modular BIOS update is particularly useful in systems having several independent BIOS's stored within unitary firmware.

23 Claims, 6 Drawing Sheets

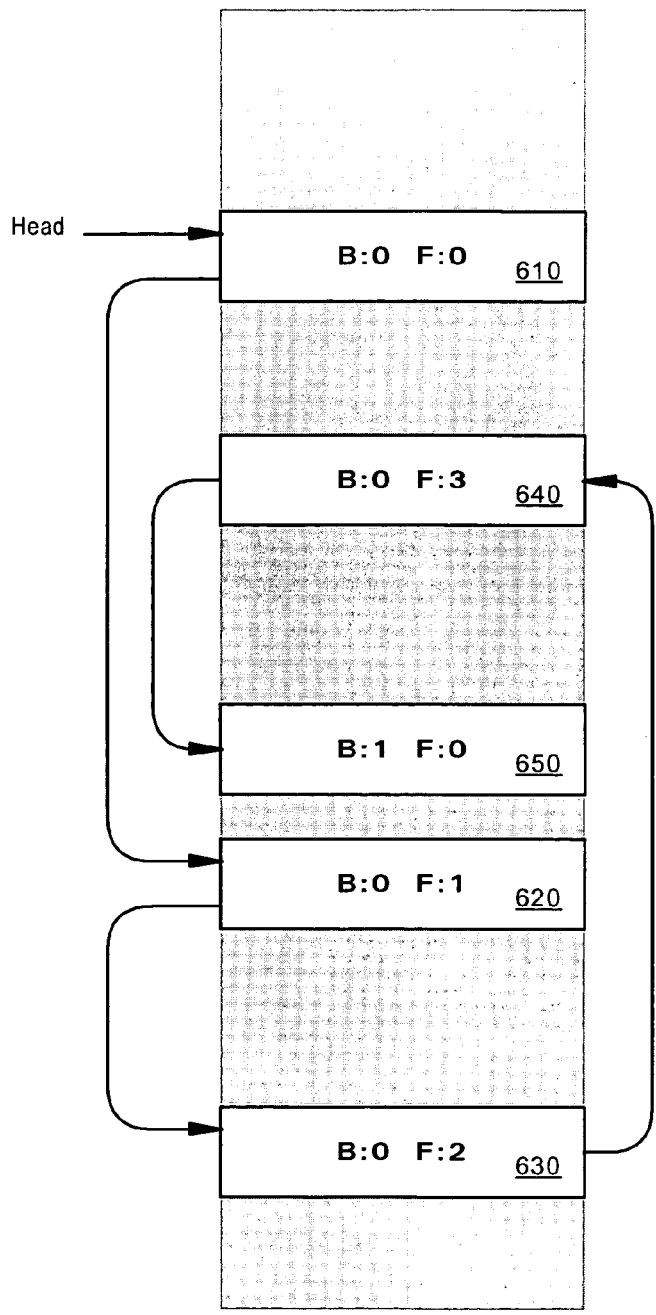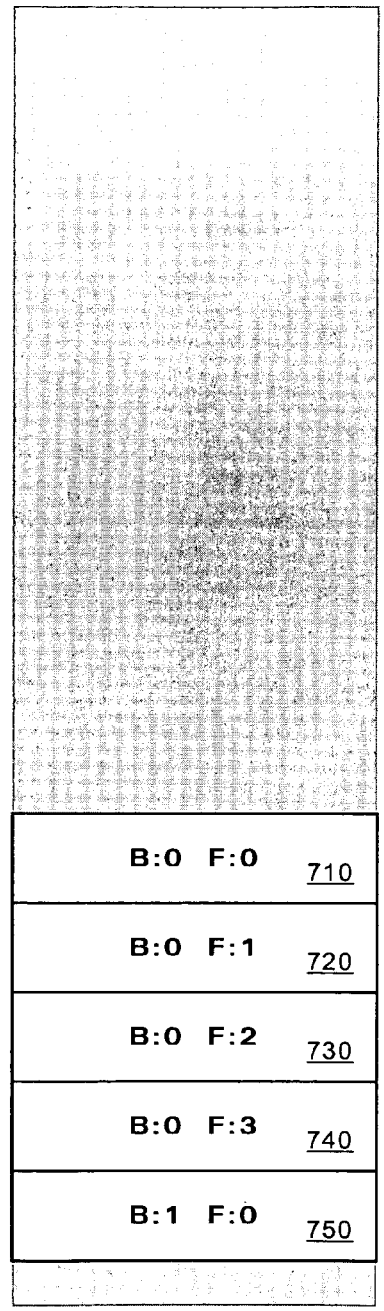
FIG. 5
600
FIG. 6
700

800

1000

MODULAR BIOS UPDATE MECHANISM

BACKGROUND

Embodiments of the present invention provide techniques for updating system BIOS components of a modern computer system on a modular basis.

As functional elements of a computer system increasingly are being integrated into unitary integrated circuits, multiple BIOS images that formerly may have been stored in isolated options ROM's also may be integrated into a unitary firmware system. This larger scale of integration creates a need to be able to update system BIOSs or elements stored in the unitary firmware without having to replace the entire system BIOS.

For example, Intel Corporation, the assignee of the present invention is designing a single integrated circuit that merges the functionality of a processor, a graphics controller and a memory controller. Thus, the integrated circuit may communicate with firmware that includes both a system BIOS governing input/output transactions throughout the system but also may include a video BIOS for the graphic controller functionality. Video BIOS upgrades may be published independently of system BIOS updates. Accordingly, there is a need in the art for a system BIOS that permits modular updates to BIOS components in the storage medium. For example, it may be advantageous to update the video BIOS without disturbing the entire system BIOS in the storage medium.

BRIEF DESCRIPTION OF THE DRAWINGS

FIG. 5 is a memory map illustrating memory locations of fragments.

FIG. 6 is a memory map illustrating a reassembled BIOS package.

DETAILED DESCRIPTION

Embodiments of the present invention provide an MBU mechanism—a standardized method to update options ROM's and provide video and processor microcode updates without requiring a complete replacement of the system BIOS. The MBU mechanism provides several advantages. First, new features and BIOS bug fixes may be delivered to an installed base of end-user systems even if direct OEM support cannot be identified. Also, BIOS components may be provided as a validated set of revisions. With resort to a validation matrix, BIOS updates may be managed easily.

Figure 1:
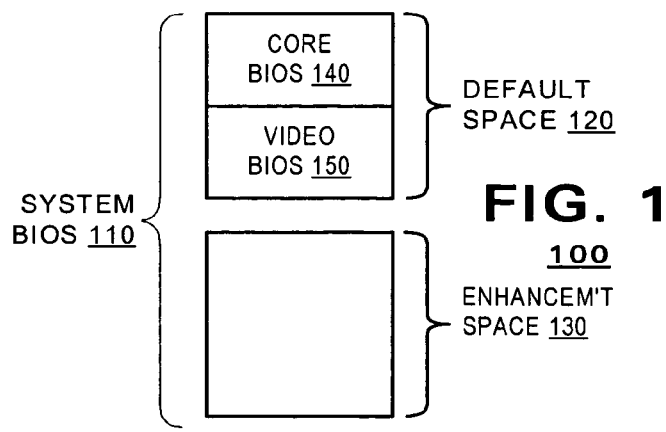
FIG. 1 illustrates a system BIOS according to an embodiment of the present invention.

FIG. 1 illustrates a memory space 100 storing a system BIOS 110 according to an embodiment of the present invention. The memory space 100 may include a first memory space 120 and a second memory space 130. The first memory space may store core BIOS 140 and one or more ancillary BIOS's. For example, FIG. 1 illustrates a core BIOS 140 and a video BIOS 150 stored in the first memory space 120. The first memory space 120 may be provided in firmware but alternatively may be provided in conventional ROM memory. According to an embodiment, the first memory space 120 need not provide for writing of data to the space 120. During operation, additional BIOS's may be written to the firmware 100. Regardless of whatever additional BIOS's are present in the firmware 100, those BIOS's stored in the first memory space 120 are expected to remain therein permanently. Accordingly, the first memory space 120 at times may be referred to as the "default space."

The second memory space 130 may store the additional BIOS's. Therefore, it may permit writing of data thereto. The second memory space 130 may store enhancements to the default system BIOSs. Accordingly, the second memory space 130 at times may be referred to as the "enhancement space."

The enhancement space 130 may provide for storage of BIOS elements to supplement or substitute for those BIOS elements stored in the default space 120. By way of example, the enhancement space 130 may store:
- microcode updates that correct microcode errors in the agent,
- BIOS updates or patches that fix bugs in the default BIOS space, and
- BIOS modules that substitute for a BIOS in the default space during operation, and
- updateable video driver parameter data tables, tables providing parameters that configure the same driver to be used across multiple silicon revisions.

It is expected that any BIOS elements that are provided in the default space 120 will not be altered after fabrication. However, updates can be stored in the enhancement space 130. The enhancement space 130 also may store an index table that maps BIOS elements in the enhancement space and the default spaces 120, 130. Thus, the allocation table 130 may contain pointers that identify which system BIOSs or system elements from the default space 120 are being replaced by the elements of the enhancement space.

Figure 2:
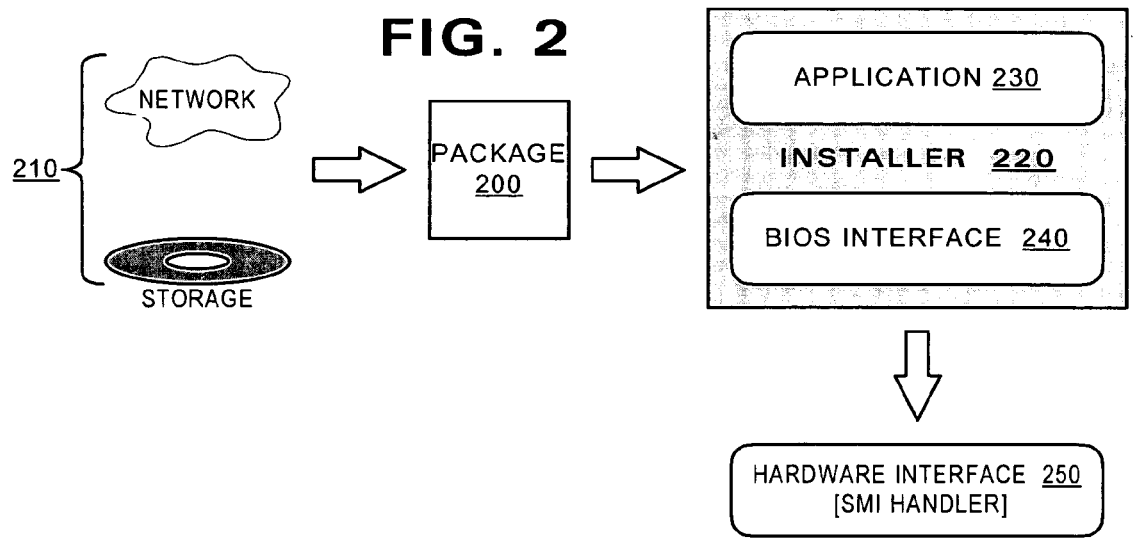
FIG. 2 is a usage model according to an embodiment of the present invention.

FIG. 2 is a usage model according to an embodiment of the present invention. According to this embodiment, a computer system may program itself with BIOS enhancements autonomously. FIG. 2 illustrates an "MBU package" 200, a data object that may include one or more BIOS packages (not shown). The MBU package 200 may be input to the computer system via an input/output device such as an electrical, magnetic or optical storage device or via a communications interface, such as those provided for intranet, internet or wireless computer networks (collectively represented as 210).

The computer system may include an installer 220. The installer 220 may include an application program 230 and a BIOS interface driver 240 designed to process the MBU package 220 in accordance with the embodiments described herein. In one embodiment, the installer 220 may interface with a computer network, such as an Internet, to search for and download a most recent MBU package for the computer system. Once the MBU package 200 is received, the installer 220 may disassemble the MBU package into discrete BIOS packages and may invoke any hardware interfaces 250 that may be necessary to update the firmware.

According to an embodiment, a BIOS package may include not only the BIOS update itself but also associated validation and revision information. The installer 220 may have a role in validation and revision comparison. For revisions, prior to installation, the installer 220 may compare the revision information of the BIOS update with revision information (if any) that may be associated with previously stored system BIOSs, those stored in the default space 110 (FIG. 1) and those stored in the enhancement space 120 (FIG. 1). In this embodiment, if the comparison determines that the BIOS update provided in the package is not more current than a copy previously stored, the installer 220 may terminate the installation process.

According to an embodiment, the installer 220 may store the BIOS package in system memory for installation. The installer 220 also sets certain flags in system memory to indicate that system memory stores a BIOS package. The installer 220 also may disable certain hardware security locks that may attach to the firmware that may prevent data writes to the firmware during normal operation. Typically, the hardware security locks may be disabled with a conventional call to a System Management Interrupt ("SMI") handler 250. The SMI handler 250 may disable the computer's operating system and permit updates to the BIOS.

Once the installer 220 has stored the package in system memory, the installation process terminates. At the conclusion of the installation process, the installer 220 may reset the processor in such a manner that the processor restarts but the contents of system memory are maintained. For example, this may be accomplished by asserting INIT# on many Intel processors.

Figure 3:
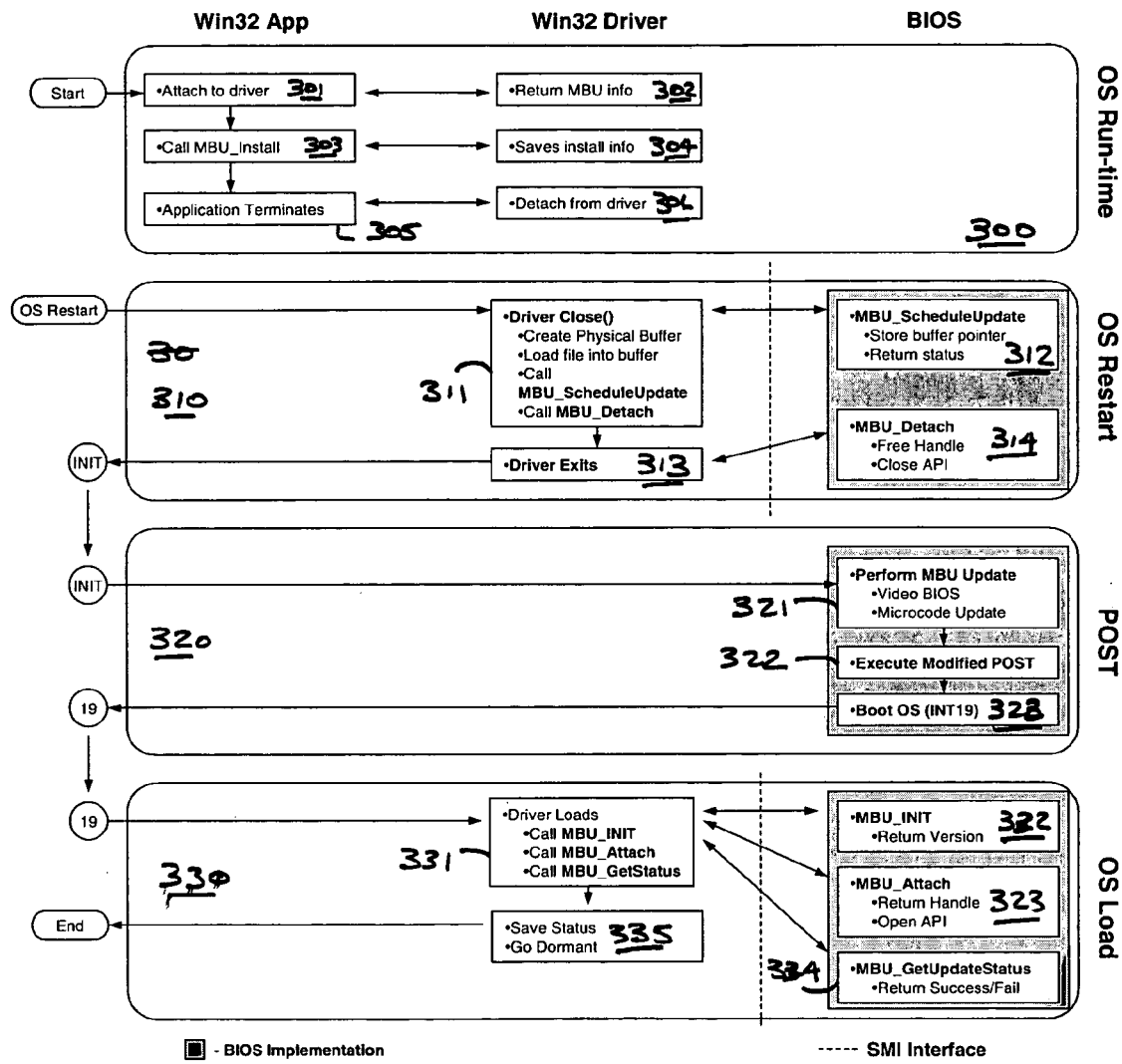
FIG. 3 is a high level flow diagram illustrating an embodiment of the modular BIOS update ("MBU") process and interaction between the BIOS and driver during the installation of a BIOS package.

FIG. 3 is a high-level flow diagram illustrating an embodiment of the MBU process 299. FIG. 3 illustrates operation in several phases of execution: operating system ("OS") run-time 300 OS restart 310, POST 320 and OS load 330. The process may begin at the START point after the installer application 230 is started. As the installer application 230 starts, it may attach the MBU driver 240 (Box 301). In response, the driver 240 may determine an interface revision supported by the MBU SMI handler (Box 302). If the revision number is recognized by the driver, the driver may attach to the SMI handler with a command that creates and returns a handle to be used for all calls during the MBU process 300. After initialization completes, the driver 240 may return control to the installer application 230. If there is an install to be done, the installation application 230 may create any necessary pointers to the package fragments (discussed herein) and may call the MBU driver's install entry point (Box 303). The MBU driver 240 may save this information and return to the installation application 230 (Box 304). At this point in the install process, the installation application 230 can exit leaving the install request pending in the MBU driver's update queue (Boxes 305, 306). The MBU driver 240 may remain in an idle state until the OS sends a close message to the MBU driver 240 during shutdown.

As operating systems prepare to restart, they typically send MSG_CLOSE messages to all drivers on a notification list. The MBU driver 240 may be included on this list. During restart, the MBU driver 240 may receive a MSG_CLOSE message and examine its pending update table for an MBU update (Box 311). If there is an update to be done, the MBU driver 240 may create a physical buffer in system memory, may load the update package from the file into main memory and may set a flag in memory informing the BIOS that an update is to be performed (Box 312). The MBU driver 240 then may release its handle with the SMI handler 250 and terminate (Boxes 313, 314). Thereafter, the OS may close in a conventional manner.

Once the OS has closed, it may generate an INIT# to the processor. The INIT# does not reset the memory controller, leaving system memory intact. The INIT# resets the processor to the boot vector and resets the memory's locking scheme to a state that allows programming. In FIG. 3, this is illustrated as the POST phase 320. During the POST phase 320, system BIOS may retrieve the package from system memory, authenticate the package and write the package into the enhancement space (Box 321). Once the update is complete, the system BIOS may issue a system reset and start a normal POST process (Boxes 322, 323). Once the system BIOS begins to load the OS, control may be transferred to the OS Load phase 330 of FIG. 3.

In the OS Load phase 330, the OS loads the drivers in the "driver startup" list (Box 331). One of the drivers in this list is the MBU driver 240. When the MBU driver 240 loads, it may attach to the SMI handler 250 and determine a version of the MBU-SMI interface supported by the handler 250 (Box 332). If the MBU driver 240 recognizes the version number, it may attempt to attach to the SMI handler 250 again by creating a handle to the driver for use with future calls (Box 333). The MBU driver 240 then may determine the status of the most recent update (Box 334). The MBU driver 240 may save the status and remain idle until called by the installer application 230 (Box 335). The update process is complete.

Figure 4:
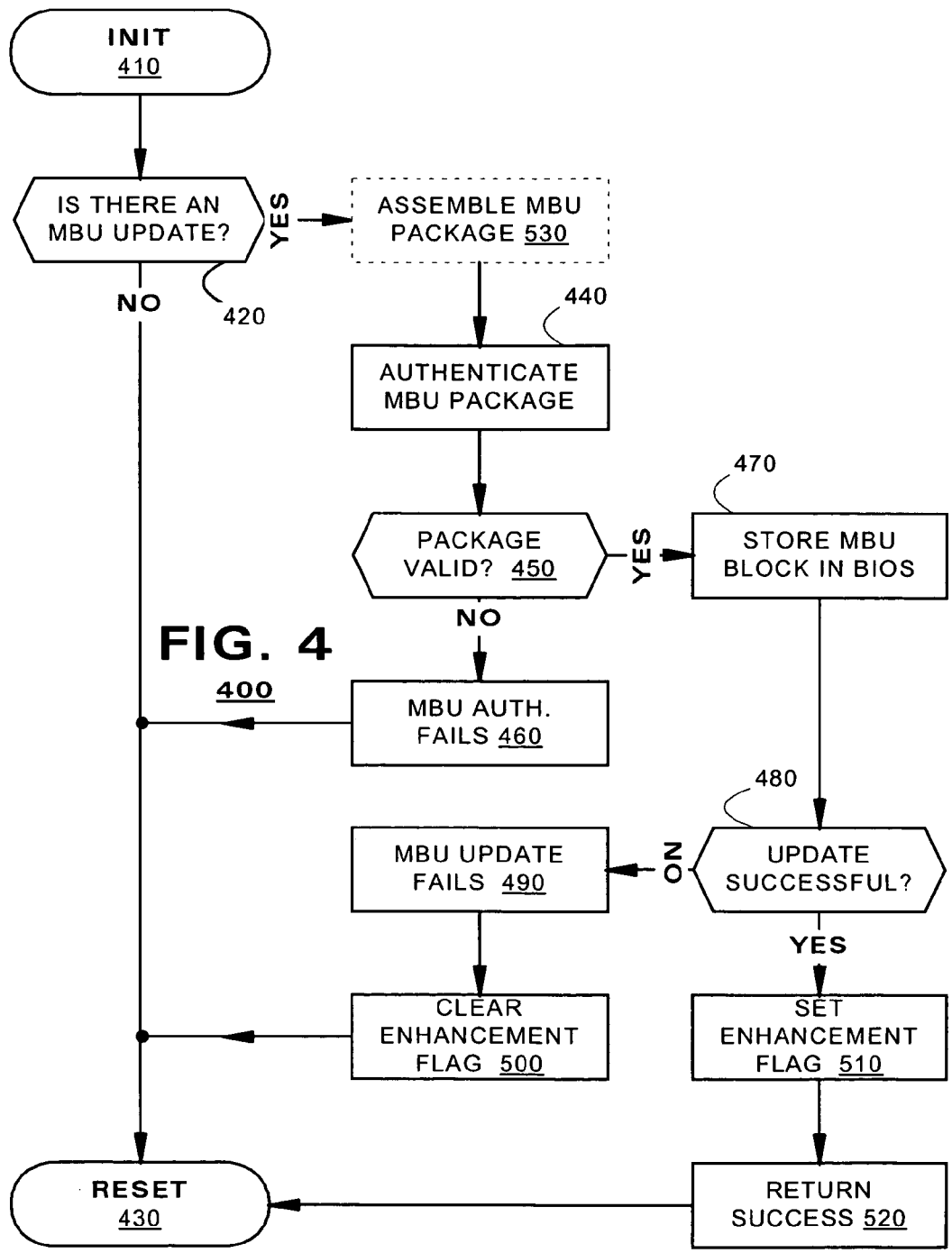
FIG. 4 illustrates a method of updating firmware according to an embodiment of the present invention.

FIG. 4 illustrates a method 400 of updating firmware during the POST phase of FIG. 3 according to an embodiment of the present invention. After the BIOS is restarted (Box 410), the BIOS will undergo a startup procedure. At some point during the start up procedure, preferably before any element of the ancillary BIOS in the default space is executed, the BIOS may determine whether the BIOS indicates the presence of a MBU package (Box 420). If not, the BIOS may exit the method 400 and continue with the startup procedure, eventually resetting the entire system (Box 430).

If, however, the memory contains an identifier that a BIOS package exists, the BIOS attempts to authenticate the MBU package (Box 440). The BIOS determines whether authentication is successful and the MBU package is valid (Box 450). If not, if the MBU package is invalid, the BIOS returns an MBU authorization failure (Box 460) and exits the method (Box 430).

If validation succeeds, the BIOS begins to write the MBU package to the enhancement space (Box 470). At the conclusion of the write, the BIOS determines whether the update succeeds (Box 480). If not, the BIOS returns an MBU update failure (Box 490) and clears the MBU update flag from BIOS (Box 500). Otherwise, the BIOS may set the enhancement flag (Box 510) and returns a status flag indicating successful storage (Box 520). Once the enhancement table has been amended, the method may terminate.

Upon termination of the method 400, the BIOS may reset the entire system. A system reset not only restarts the BIOS itself but also clears system memory. When the system resets, the MBU packages may be invoked as determined by their content.

Package Authentication

As noted, the MBU update process may include package authentication. According to an embodiment, the MBU package may contain authentication information that uniquely identifies the source of the MBU package. For example, the authentication information may occur according to a public-private key pair. A public key may be stored by the BIOS in the default space 110 (FIG. 1). The newly received MBU package may be signed with a private key. Using the public key, the processor may examine the contents of the MBU package and the signature that accompanies the MBU package to authenticate the package. Success indicates that the MBU package was published by an authentic source. Failure may indicate that the MBU package was not published by an authentic source, that the MBU package somehow was corrupted after publication or that some other error occurred. The BIOS may terminate the MBU update process if authentication fails.

According to an embodiment, the public key-private key pair may be based on one of the well-known signature algorithms such as RSA or DSA signature systems. Other signature algorithms are known.

During implementation, publishers of MBU packages are expected to maintain control of private keys. Thus, a successful authentication against the signature included with the MBU package should indicate that the MBU package originated from an authorized source.

Buffer Fragment Table

Conventionally within computer systems, memory spaces may be allocated in units of a predetermined size. For example, operating systems of many computer systems conventionally allocate "pages" of a predetermined size, say 4 or 8 kilobytes. A MBU package is not limited by the page size of these systems. According to an embodiment, MBU package may span several pages. Thus, when stored in main memory by the installation application of the operating system 240 (FIG. 2), portions of the MBU package may be stored in several discontinuous pages throughout system memory.

In an embodiment, the installation application 220 may interface with the operating system to allocate pages to fragments of the MBU package. The installation application 220 also may create a fragment buffer table identifying memory locations where each of the fragments may be found. By way of example, Table 1 below represents information that may be contained in one such fragment buffer table:

TABLE 1

| Fragment Base Address | Buffer No. | Fragment No. | Fragment Size | Address of Next Fragment |
|---|---|---|---|---|
| 0x80_0000 | 0x0 | 0x0 | 8180 (0x1FF4) | 0x12_0000 |
| 0x12_0000 | 0x0 | 0x1 | 8180 (0x1FF4) | 0x09_2000 |
| 0x09_2000 | 0x0 | 0x2 | 8180 (0x1FF4) | 0x64_6000 |
| 0x64_6000 | 0x0 | 0x3 | 1583 (0x62F) | 0x4C_A000 |
| 0x4C_A000 | 0x1 | 0x0 | 256 (0x100) | 0x00_0000 |

As shown in this example, the fragment buffer table may track multiple "buffers" for each BIOS package. A first buffer contains the BIOS code itself and a second buffer contains a digital signature associated with the BIOS code. FIG. 5 is a memory map 600 illustrating the memory locations of the fragments 610–650 listed in Table 1.

According to an embodiment, the buffer fragment table may identify for each fragment of each buffer, a buffer and fragment number for the fragment, a base address representing the fragment's location in main memory, a size identifier representing the fragment's size and an address of the next fragment. This information may be provided in a predetermined location in system memory prior to the INIT. Thus, when the method 400 is invoked, the processor may determine whether a buffer fragment table exists and, if so, assemble the MBU package from the buffer fragments identified in the table (FIG. 3, Box 520). FIG. 6 is a memory map 700 illustrating the reassembled BIOS package. Thereafter, the processor may continue with the MBU update.

Post Flow Processing

Figure 7:
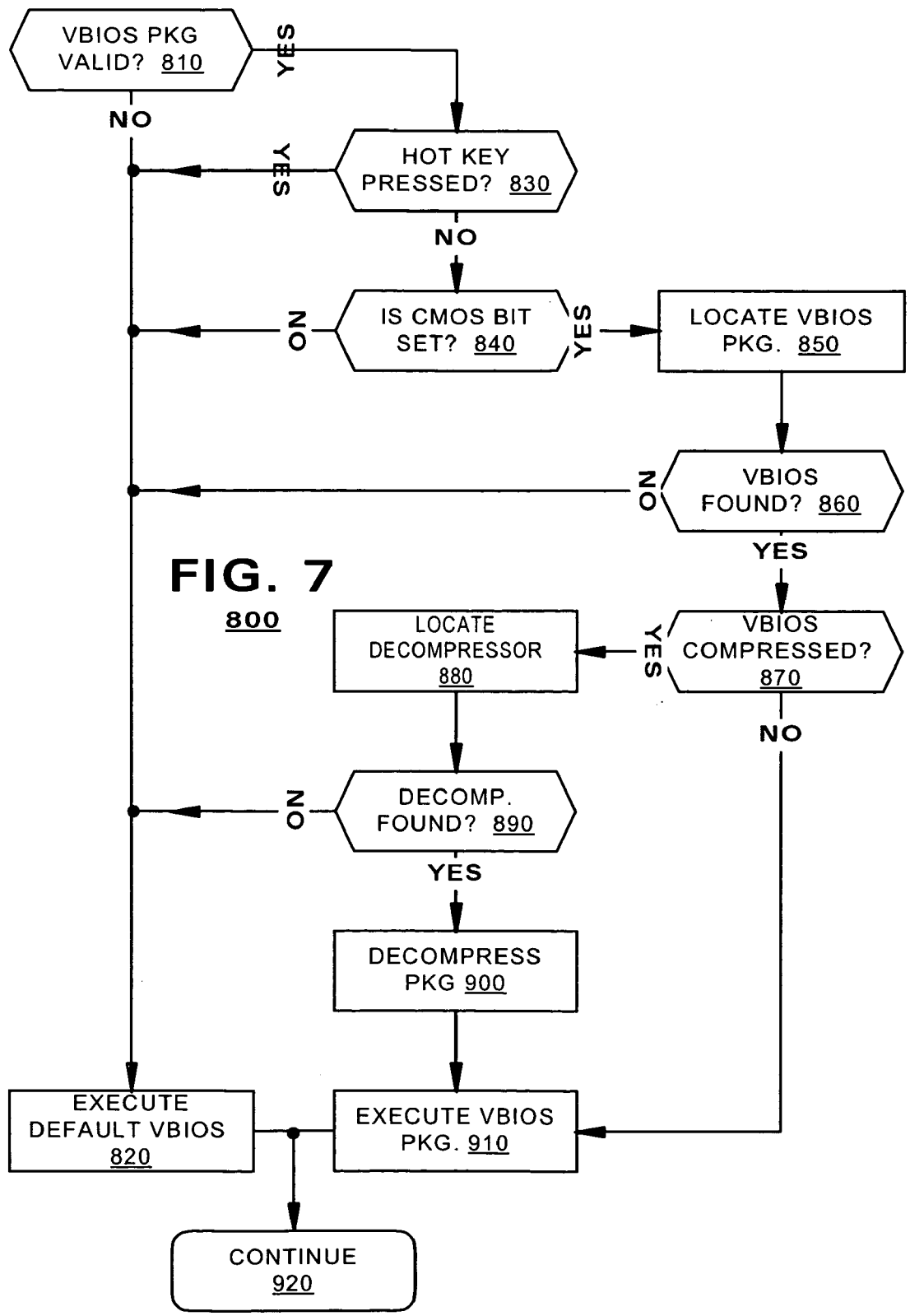
FIG. 7 illustrates a method of updating video BIOS according to an embodiment of the present invention.

To support MBU updates, a conventional system BIOS may include additional functionality to permit installing new processor microcode updates, loading an updated video BIOS from the MBU block, checking for the video bypass hotkey, checking for CMOS bits indicating flow options and the presence of option ROM's or BIOS packages from the MBU block. These features are described next. FIG. 7 is a flow diagram of this process 800 according to an embodiment of the invention.

When preparing to initialize the video BIOS, a BIOS may scan the MBU block for an existing video BIOS update for the specific graphics device of the system before attempting to execute the default video BIOS image. Before starting the scan of the MBU block, a system BIOS may check to make sure the MBU block is valid (Box 810). This can be done quickly by checking a header ID of the MBU block. If the MBU block is invalid, the default option ROM may be executed (Box 820), else the BIOS checks for the depression of a predetermined bypass hot key (Box 830).

If a hotkey is pressed, it signifies a user command that the default video BIOS should not be executed (Box 820). Pressing the bypass hotkey, however, does not cause the system BIOS to clear the CMOS bit identifying the presence of the BIOS package. If no hotkey is pressed, the system BIOS checks the CMOS bit (Box 840). If the bit is enabled, system BIOS begins looking for the video BIOS update in the MBU block (Box 850). At this point, a video BIOS is present in the MBU block (Box 860).

After the video BIOS is found in the MBU block, system BIOS may determine if the video BIOS package is compressed (Box 870). If so, the system BIOS may search the MBU block for decompression code associated with the video BIOS package (Boxes 880, 890). If no code is found, the system BIOS may run the default video BIOS because the video BIOS package is not available (Box 820). If the code is found, BIOS may decompress the video BIOS image and execute it (Boxes 900, 910).

Although unlikely, the MBU region of firmware may become corrupt or nonfunctioning. In such a case, the POST should cause the system to revert back to the default version of the video BIOS option ROM's stored in system BIOS. Execution of the default video BIOS may be forced by user input. If the system determines that a user has pressed the predetermined bypass hotkey during early boot before the video adapter has been initialized, the system BIOS may omit the scan of the MBU area and boot using the default, integrated system BIOS.

According to an embodiment, the bypass hot key disables the system BIOS of the enhancement space for a single restart. It need not disable future boots from attempting to load option ROM updates from non-volatile stores. To completely prevent the corrupted video BIOS patch from executing during POST, the CMOS enable bits may be cleared in the CMOS setup routine.

When the "Use MBU Video BIOS" CMOS option is set and no bypass keys are pressed, the BIOS may scan the MBU block looking for a video BIOS update module. If no video BIOS update module is found, the BIOS may execute the default BIOS stored as part of the system BIOS. Otherwise, the BIOS extracts the video BIOS update module, executes it and runs the remaining system BIOS (Box 920).

Loading Option ROM's

The enhancement space also may store option ROM's. According to an embodiment, option ROM's may be disabled by individual CMOS option bits.

Prior to executing any option ROM's, the system BIOS may check for updated option ROM's in the MBU block and execute those option ROM's in preference to any option ROM stored in the system BIOS image.

CMOS Options

FIG. 7 illustrates a method of updating video BIOS according to an embodiment of the present invention. The system BIOS may provide a CMOS option to allow the user the ability to disable use of the updated video BIOS in the MBU block. Herein, this bit is referred to as the "Use MBU Video BIOS" CMOS bit. The "Use MBU Video BIOS" CMOS bit is set when a successful update of the MBU block is performed. By way of example, for Intel processors, the system BIOS may set this bit from the system management mode ("SMM") environment. When this CMOS bit is set, subsequent boots may cause the system BIOS to search the MBU block for an updated video BIOS before executing the default video BIOS. If the MBU block is empty, the system BIOS may clear the disable the "Use MBU Video BIOS" CMOS bit.

As noted above, an MBU package may include several BIOS packages for installation into the enhancement space. The MBU package may be constructed according to a predetermined architecture to permit the installer to identify and process the MBU packages constituent elements.

Figure 8:
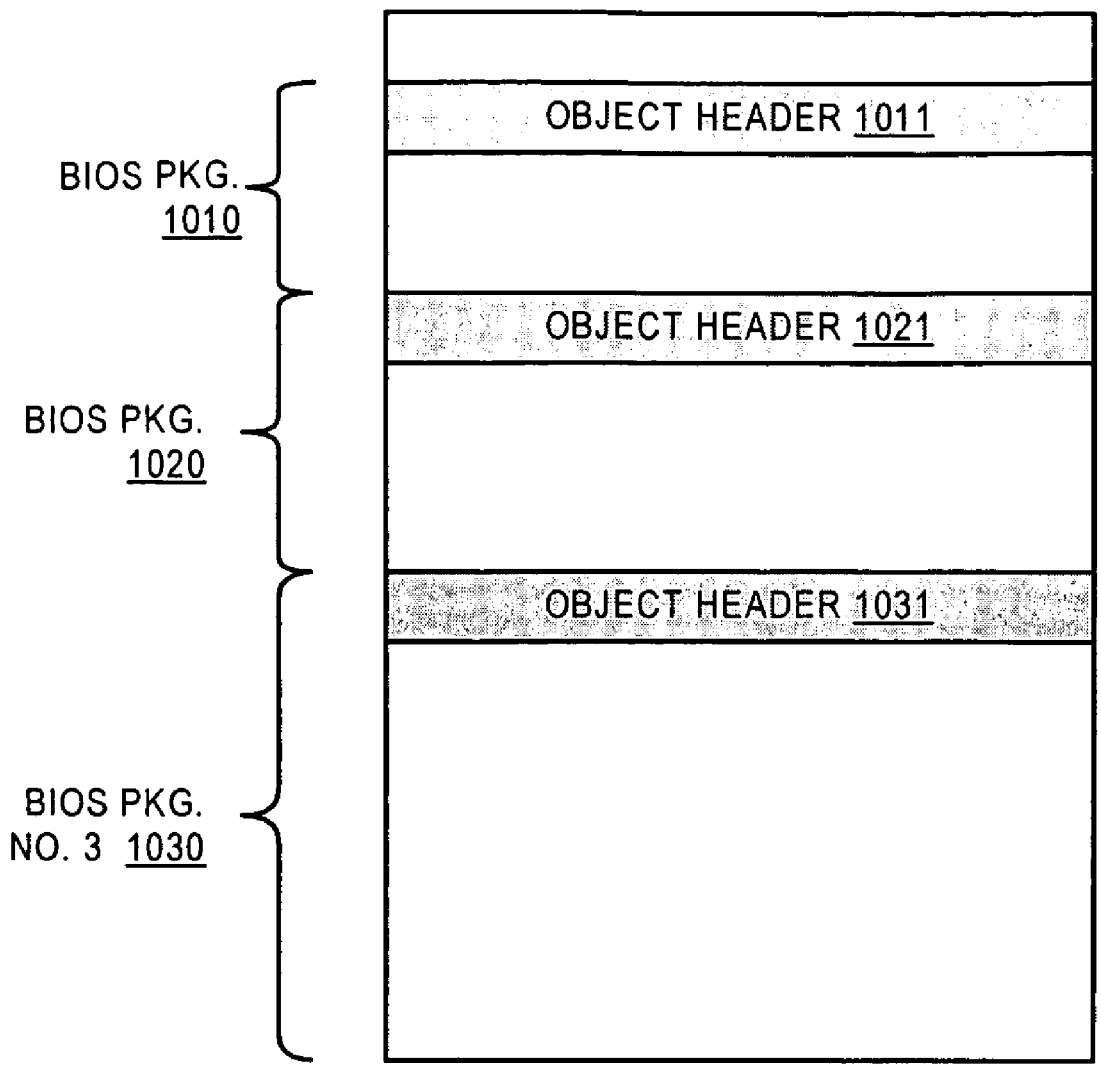
FIG. 8 shows a sample MBU package according to an embodiment of the present invention.

FIG. 8 shows a sample MBU package according to an embodiment of the present invention. Within the MBU package 1000 multiple BIOS packages 1010, 1020, 1030 may exist, some of which may be compressed and may vary in size. BIOS packages 1010, 1020, 1030 may be located adjacent to one another. Each BIOS package 1010, 1020, 1030 stored in the MBU package 1000 may include an object header 1011, 1021, 1031 that identifies the object and defines its size. The data of the object may follows the object header entry.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method for updating a system BIOS for a processor, comprising:
   upon restart of the processor, determining whether system memory contains a BIOS package for updating a modular component of the system BIOS,
   authenticating the BIOS package, and
   upon successful authentication, storing the BIOS package in a reprogrammable BIOS memory space.

2. The method of claim 1, further comprising:
   determining whether the BIOS package is successfully stored in the reprogrammable BIOS memory space,
   if so, report a success flag identifying the BIOS package as successfully stored.

3. A computer system, comprising:
   a processor,
   firmware electrically connected to the processor, the firmware comprising:
   a first storage space to store a first system BIOS, the first storage space being a read only memory,
   a second storage space to store a second system BIOS and an index table, the index table associating elements of the second system BIOS with elements of the first system BIOS.

4. The computer system of claim 3, wherein the first storage space is to store a system BIOS and at least one ancillary BIOS and the index table identifying the BIOSes.

5. A BIOS processing method, comprising:
   executing a system BIOS from a default memory space,
   executing an ancillary BIOS according to:
   determining whether an ancillary BIOS exists in an alterable memory space,
   if no ancillary BIOS exists in the alterable memory space, executing an ancillary BIOS from the default memory space.

6. The method of claim 5, further comprising, if an ancillary BIOS exists in the alterable section, executing the ancillary BIOS in the alterable memory space.

7. The method of claim 5, further comprising, determining whether a predetermined user command has been entered and, if no predetermined user command has been entered, executing the ancillary BIOS from the alterable memory space.

8. The method of claim 5, further comprising:
   decompressing an ancillary BIOS from the alterable memory space and
   executing the decompressed ancillary BIOS.

9. An ancillary BIOS processing method, comprising:
   determining whether an ancillary BIOS package is present in an enhancement space of firmware,
   if the ancillary BIOS package is present, determining whether a predetermined user command has been entered,
   if the predetermined user command has not been entered, executing the ancillary BIOS package from the enhancement space,
   otherwise, executing an ancillary BIOS from a default space of firmware.

10. The method of claim 9, further comprising:
    decompressing the ancillary BIOS from the enhancement space and
    executing the decompressed ancillary BIOS.

11. An ancillary BIOS processing method, comprising:
    determining whether an ancillary BIOS package is present in an enhancement space of firmware, the ancillary BIOS package including a BIOS update,
    if the ancillary BIOS package is present, determining whether a predetermined flag has been set in the firmware,
    if the predetermined flag has been set, executing the ancillary BIOS package from the enhancement space,
    otherwise, executing an ancillary BIOS from a default space of firmware.

12. The method of claim 11, further comprising:
    decompressing the ancillary BIOS from the enhancement space and
    executing the decompressed ancillary BIOS.

13. An ancillary BIOS processing method, comprising:
    determining whether an ancillary BIOS package is present in an enhancement space of firmware, the ancillary BIOS package including a BIOS update,
    if the ancillary BIOS package is present in the enhancement space, decompressing the ancillary BIOS package, and
    executing the ancillary BIOS package, wherein decompressing comprises searching memory for a decompressor associated with the ancillary BIOS package and, if the decompressor is not found, executing a second ancillary BIOS package from a default space of firmware.

14. A video BIOS processing method, comprising:

during execution of a system BIOS, determining whether a first video BIOS exists in an alterable firmware section of a memory system, if no video BIOS exist in the alterable section, executing a second video BIOS in a nonalterable firmware section in the memory system.

15. The method of claim 14, further comprising, if a video BIOS exists in the alterable section, executing the video BIOS in the alterable section.

16. The method of claim 14, further comprising, determining whether a predetermined user command has been entered and, if no predetermined user command has been entered, executing a video BIOS from the alterable section.

17. The method of claim 14, further comprising:
decompressing a video BIOS from the alterable section and
executing the decompressed video BIOS.

18. A video BIOS processing method, comprising:
determining whether a video BIOS package is present in an enhancement space of firmware,
if the video BIOS package is present, determining whether a predetermined user command has been entered,
if the predetermined user command has not been entered, executing the video BIOS package from the enhancement space,
otherwise, executing a video BIOS from a default space of firmware.

19. The method of claim 18, further comprising:
decompressing a video BIOS from the enhancement space and
executing the decompressed video BIOS.

20. A video BIOS processing method, comprising:
during execution of a system BIOS, determining whether a video BIOS package is present in an enhancement space of firmware, the video BIOS package in the enhancement space including a BIOS update,
if the video BIOS package is present, determining whether a predetermined flag has been set in the firmware,
if the predetermined flag has been set, executing the video BIOS package from the enhancement space,
otherwise, executing a video BIOS from a default space of firmware.

21. The method of claim 20, further comprising:
decompressing a video BIOS from the enhancement space and
executing the decompressed video BIOS.

22. A video BIOS processing method, comprising:
during execution of a system BIOS, determining whether a video BIOS package is present in an enhancement space of firmware, the video BIOS package in the enhancement space including a BIOS update,
if the video BIOS package is present in the enhancement space, decompressing the video BIOS package, and
executing the video BIOS package.

23. The video BIOS processing method of claim 22, further comprising searching memory for a decompressor for the video BIOS package and if the decompressor is not found executing a second video BIOS package from a default space of firmware.

* * * * *